(12) United States Patent
Jourdan et al.

(10) Patent No.: US 11,745,899 B2
(45) Date of Patent: *Sep. 5, 2023

(54) ADHOC GEO-FIDUCIAL MATS FOR LANDING UAVS

(71) Applicant: WING Aviation LLC, Mountain View, CA (US)

(72) Inventors: Damien Jourdan, San Jose, CA (US); Anthony Sekine, San Jose, CA (US); Scott Velez, Redwood City, CA (US); André Prager, Sunnyvale, CA (US)

(73) Assignee: WING Aviation LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/974,164

(22) Filed: Oct. 26, 2022

(65) Prior Publication Data
US 2023/0054875 A1 Feb. 23, 2023

Related U.S. Application Data

(63) Continuation of application No. 16/818,799, filed on Mar. 13, 2020, now Pat. No. 11,511,885.

(51) Int. Cl.
| | |
|---|---|
| *B64F 1/18* | (2006.01) |
| *B64C 39/02* | (2023.01) |
| *B64F 1/36* | (2017.01) |
| *B64U 10/25* | (2023.01) |

(52) U.S. Cl.
CPC .............. *B64F 1/18* (2013.01); *B64C 39/024* (2013.01); *B64F 1/362* (2013.01); *B64U 10/25* (2023.01)

(58) Field of Classification Search
CPC .......... B64F 1/18; B64F 1/362; B64C 39/024; B64U 10/25
See application file for complete search history.

(56) References Cited

U.S. PATENT DOCUMENTS

| | | | |
|---|---|---|---|
| 9,056,676 B1 | 6/2015 | Wang | |
| 9,540,121 B2 | 1/2017 | Byers et al. | |
| 9,896,202 B2* | 2/2018 | Jourdan | ................. G08G 5/045 |
| 9,964,951 B1 | 5/2018 | Dunn et al. | |
| 10,577,126 B2* | 3/2020 | Mozer | ................... B64C 39/024 |
| 10,960,988 B2* | 3/2021 | Walker | ..................... B64F 1/02 |
| 11,287,835 B2 | 3/2022 | Jourdan et al. | |
| 11,511,885 B2* | 11/2022 | Jourdan | ................. G08G 5/025 |

(Continued)

FOREIGN PATENT DOCUMENTS

CN 108275281 A 7/2018

OTHER PUBLICATIONS

International Search Report and Written Opinion, dated Dec. 23, 2021, in corresponding International Application No. PCT/US2021/020271, 22 pages.

*Primary Examiner* — Gertrude Arthur Jeanglaude
(74) *Attorney, Agent, or Firm* — CHRISTENSEN O'CONNOR JOHNSON KINDNESS PLLC (57) ABSTRACT

An apparatus for visual navigation of a UAV includes a geo-fiducial mat and a plurality of geo-fiducials. The geo-fiducial mat includes a landing pad region that provides a location for aligning with a landing pad of a UAV. The geo-fiducials each includes a two-dimensional (2D) pattern that visually conveys a code. The 2D pattern has a shape from which a visual navigation system of the UAV can visually triangulate a position of the UAV.

21 Claims, 9 Drawing Sheets

(56) References Cited

U.S. PATENT DOCUMENTS

| | | |
|---|---|---|
| 2016/0122038 A1 | 5/2016 | Fleischman et al. |
| 2017/0011333 A1 | 1/2017 | Grenier et al. |
| 2017/0096075 A1 | 4/2017 | Henry et al. |
| 2017/0113800 A1 | 4/2017 | Freeman |
| 2017/0225800 A1 | 8/2017 | Holt et al. |
| 2017/0323129 A1 | 11/2017 | Davidson et al. |
| 2018/0039286 A1 | 2/2018 | Tirpak et al. |
| 2018/0053139 A1 | 2/2018 | Stoman |
| 2019/0087635 A1 | 3/2019 | Klaus |
| 2019/0273909 A1 | 9/2019 | Ye et al. |
| 2020/0017237 A1 | 1/2020 | Walker |

* cited by examiner

| PAD ID | FIDUCIAL MARKER | FIDUCIAL MARKER IMAGE | LATITUDE | LONGITUDE | ALTITUDE | HEADING | ZIP CODE | |
|---|---|---|---|---|---|---|---|---|
| 000 | a | b | c | d | e | f | g | h |
| 001 | i | j | k | l | m | n | o | p |
| 002 | q | r | s | t | u | v | w | x |
| ... | ... | ... | ... | ... | ... | ... | ... | ... |
| 902 | 020 | y | z | aa | bb | cc | dd | ee |
| 902 | 021 | ff | gg | hh | ii | jj | kk | ll |
| 902 | 022 | mm | nn | oo | pp | qq | rr | ss |
| 902 | 023 | tt | uu | vv | ww | xx | yy | zz |
| 902 | 024 | aaa | bbb | ccc | ddd | eee | fff | ggg |
| 902 | 025 | hhh | iii | jjj | kkk | lll | mmm | nnn |
| 902 | 026 | ooo | ppp | qqq | rrr | sss | ttt | uuu |
| 902 | 027 | vvv | www | xxx | yyy | zzz | aaaa | bbbb |
| 902 | 028 | cccc | dddd | eeee | ffff | gggg | hhhh | iiii |
| 902 | 029 | jjjj | kkkk | llll | mmmm | nnnn | oooo | pppp |
| ... | ... | ... | ... | ... | ... | ... | ... | ... |

FIG. 6

ADHOC GEO-FIDUCIAL MATS FOR LANDING UAVS

CROSS-REFERENCE TO RELATED APPLICATIONS

This application is a continuation of U.S. application Ser. No. 16/818,799, filed on Mar. 13, 2020, the contents of which are incorporated herein by reference.

TECHNICAL FIELD

This disclosure relates generally to unmanned aerial vehicles (UAVs), and in particular but not exclusively, relates to visual navigation and landing pads for UAVs.

BACKGROUND INFORMATION

A UAV is a vehicle capable of air travel without a physically-present human operator. UAVs may be provisioned to perform various different missions, including payload delivery, exploration/reconnaissance, imaging, public safety, surveillance, or otherwise. The mission definition will often dictate a type of specialized equipment and/or configuration of the unmanned vehicle.

Safe and efficient UAV navigation relies upon the UAV having an accurate and precise navigation solution (for example, a latitude, longitude, and altitude). For example, a UAV may rely on a global positioning system (GPS) to generate a navigation solution in wide open environments; however, GPS navigation may lack the precision necessary to navigate a UAV in confined or crowded environments (such as an indoor UAV base having numerous UAVs). In addition, weather and other contingencies may degrade GPS signal strength, which may compromise the ability of a UAV to generate an accurate navigation solution by GPS. Some environments may experience degraded GPS performance, for example due to multipath, and others may be completely GPS-denied, i.e., may lack GPS signal altogether. These are merely exemplary scenarios, as other challenges characterize UAV navigation. Ultimately, the ability to generate a reliable, accurate, and precise navigation solution is important to efficient and safe UAV navigation.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method for visual navigation of an unmanned aerial vehicle (UAV) are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments described herein provide a quick and efficient adhoc technique for deploying a visual navigation system for UAVs. The technique is particularly well suited for rapid deployment of landing pads where more precise navigation is needed than is currently available from the civilian global positioning system (GPS). The technique positions multiple geo-fiducials about a landing pad, but only requires a survey of a single point. The multiple geo-fiducials are each deployed about a landing pad region at specified unique directional and offset positions relative to the survey point. Some geo-fiducials may be disposed on or adhered to the landing pads themselves. Some or all of the geo-fiducials may be integrated into a geo-fiducial mat that is quickly deployable and easily aligned with a landing pad, which may also function as a charging pad for the UAV. The geo-fiducial mat may be rolled, folded, or assembled similar to puzzle pieces to provide easy transport and quick deployment. The geo-fiducials are two-dimensional (2D) patterns that may be used for visual triangulation and which each visually convey an alphanumerical code for uniquely identifying the specific geo-fiducial. A pad identification associated with the landing pad informs the UAV that the geo-fiducials are adhoc, which triggers the UAV to compute the individual locations of each geo-fiducial based upon the location information of the single survey point and the unique directional and offset position specified for each geo-fiducial. The locations are then populated into the UAV's geo-fiducial map. The addition of the adhoc geo-fiducials into the geo-fiducial map may occur upon initial takeoff from the landing pad. However, this technique may be used for adding any number or type of geo-fiducials at a variety of different times.

Figure 1:
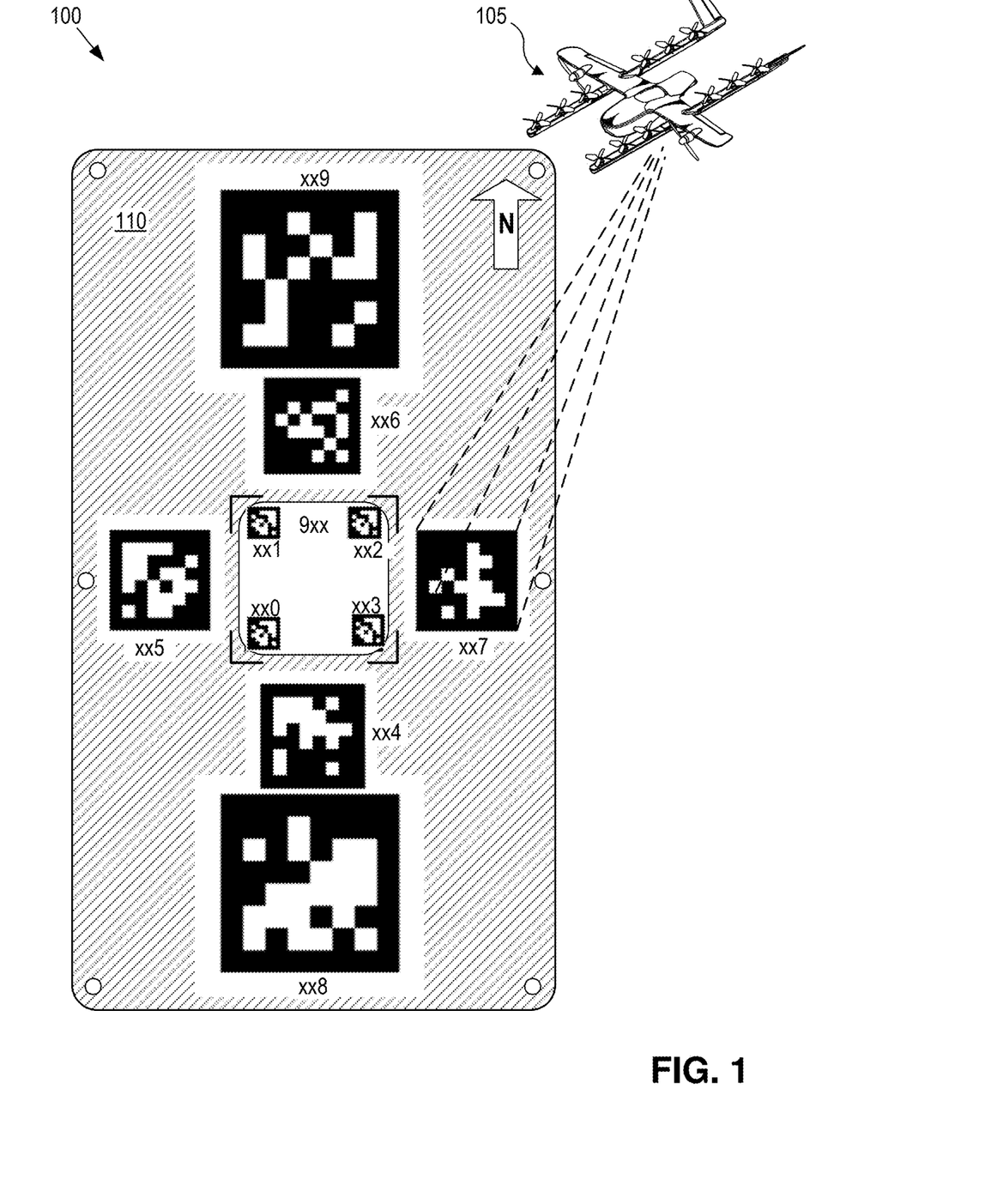
FIG. 1 illustrates a system for visual navigation of an unmanned aerial vehicle (UAV) during landing or takeoff using a geo-fiducial mat, in accordance with an embodiment of the disclosure.
Figure 2A:
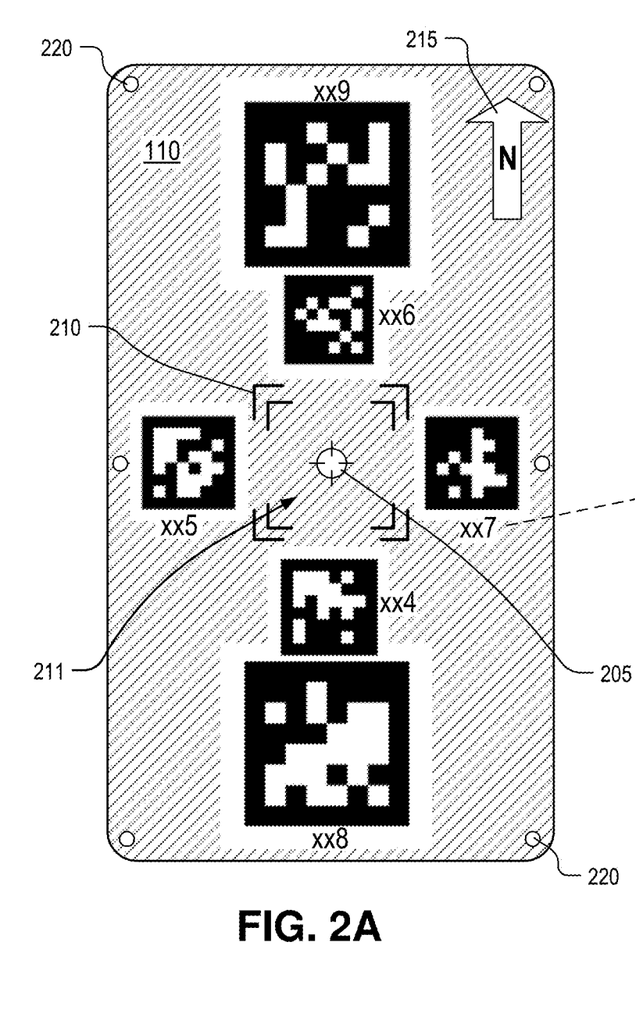
FIG. 2A illustrates a geo-fiducial mat including mid-sized and large geo-fiducials, in accordance with an embodiment of the disclosure.
Figure 2B:
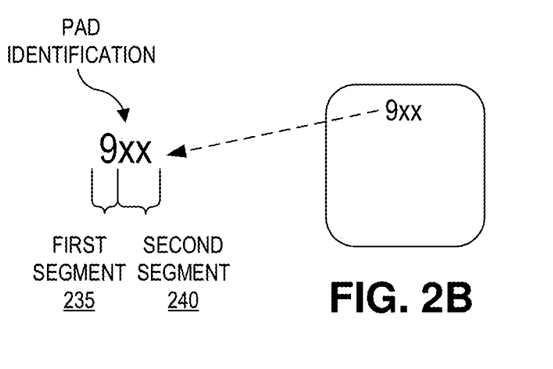
FIG. 2B illustrates a landing pad that is to be aligned with a landing pad region on the geo-fiducial mat, in accordance with an embodiment of the disclosure.
Figure 2C:
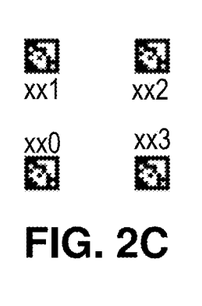
FIG. 2C illustrates small geo-fiducials for adhering to, or positioning adjacent to, the landing pad, in accordance with an embodiment of the disclosure.

FIG. 1 illustrates a system 100 for visual navigation of a UAV during landings, takeoffs, or close-in navigation using a geo-fiducial mat, in accordance with an embodiment of the disclosure. The illustrated embodiment of system 100 includes a UAV 105 having an optical navigation system, a geo-fiducial mat 110, a plurality of geo-fiducials xx0 through xx9, and a landing pad 9xx. FIG. 2A-2C illustrate the components of system 100 separated from each other. For example, FIG. 2A illustrates just geo-fiducial mat 110, FIG. 2B illustrates just landing pad 9xx, and FIG. 2C illustrates just geo-fiducials xx0-xx3.

Referring to FIG. 2A, the illustrated embodiment of geo-fiducial map 110 includes the following components integrated thereon: mid-sized geo-fiducials xx4-xx7, large geo-fiducials xx8 and xx9, a survey point 205, alignment markings 210 defining a landing pad region 211, a directional marker 215, and hold-down points 220. As illustrated in FIG. 1, landing pad 9xx is placed on geo-fiducial mat 110 and aligned by alignment markings 210. Small geo-fiducials xx0-xx3 are adhered to or otherwise disposed on landing pad 9xx. Small geo-fiducials xx0-xx3 may also be positioned on (or integrated with) geo-fiducial mat 110 immediately adjacent to landing pad region 210.

Geo-fiducials xx0-xx9 are 2D patterns having a shape from which an optical navigation system of UAV 105 can visually triangulate its position. For example, the geo-fiducials may be composed of a high contrast pattern (e.g., black and white rectangular pixels) formed into an overall rectangular or square shape. The corners of the overall shape of each 2D pattern may be referenced by the optical navigation system to triangulate a position of UAV 105. To improve visibility, each geo-fiducial may be outlined with a white border and geo-fiducial mat 110 may otherwise be colored with a mid-level shade of grey. For example, if a greyscale value of 0 is associated with white and a greyscale value of 100 is associated with black, then geo-fiducial mat 110 may generally be colored with a grey scale value of approximately 50.

In the illustrated embodiment, geo-fiducials are provided in three different sizes small (xx0-xx3), medium (xx4-xx7), and large (xx8 and xx9). The illustrated geo-fiducials are positioned at four different corners or along four different sides of landing pad region 211. In one embodiment, the small geo-fiducials are approximately 16.3 cm square in size and positioned closest to the center of landing pad region 211. Of course, other sizes (e.g., 24.3 cm square) may be implemented. In the illustrated embodiment, the small geo-fiducials are adhered to or otherwise disposed on landing pad 9xx in its four corners. In other embodiments, the small geo-fiducials may be centered along the four sides of landing pad 9xx or even positioned on or integrated into geo-fiducial mat 110 immediately adjacent to landing pad 9xx as opposed to being disposed on landing pad 9xx. Due to their closest proximity to the center of landing pad region 211 and their small size, the small geo-fiducials are the first geo-fiducials seen by UAV 105 upon initial takeoff and the geo-fiducials used for navigation at close in distances. They provide close-in navigation for precise landing on landing pad 9xx.

The medium geo-fiducials xx4-xx7 are larger than the small geo-fiducials and positioned further away from the center of landing pad region 211 than the small geo-fiducials. In one embodiment, the medium geo-fiducials are approximately 32.6 cm square in size. Of course, other sizes (e.g., 48.6 cm square) may be implemented. In the illustrated embodiment, four medium geo-fiducials are each aligned with the mid-point of a corresponding side of the rectangular landing pad region 211. The medium geo-fiducials provide intermediate range navigation to UAV 105 and can be seen by the optical navigation system of UAV 105 from relative higher altitudes than the small geo-fiducials.

The large geo-fiducials xx8-xx9 are larger than the small and medium geo-fiducials and positioned further away from the center of landing pad region 211 than the small and medium geo-fiducials. In one embodiment, the large geo-fiducials are approximately 81.8 cm square in size. Of course, other sizes (e.g., 122 cm square) may be implemented. In the illustrated embodiment, two large geo-fiducials are positioned on opposing sides of landing pad region 211 and aligned with a mid-point of the sides of the rectangular landing pad region 211. The large geo-fiducials provide high altitude navigation to UAV 105 and can be seen by the optical navigation system of UAV 105 from relative higher altitudes than the small or medium geo-fiducials. Other numbers, combinations, sizes, and positions of small, medium, and large geo-fiducials may be implemented.

The 2D pattern of each geo-fiducial visually conveys an alphanumerical code. In one embodiment, the 2D pattern is similar to a quick response (QR) code, though other types of visual codes may be used. The alphanumerical code may be strictly numbers, strictly letters, characters, or symbols, or any combination of all of these. In the illustrated embodiment, the alphanumerical code of each geo-fiducials is a three-digit number, though shorter or longer codes may be used. In the illustrated embodiment (see FIGS. 2A-C), the alphanumerical code conveyed by each of the geo-fiducials shares a common first portion 225 that is associated with a pad identification of landing pad 9xx and different second portion 230 that individually distinguishes each of the geo-fiducials associated with a given geo-fiducial mat 110 from each other. Similarly, the pad identification (e.g., 9xx) includes a first segment 235 having a value (e.g., '9') indicating that the geo-fiducials associated with geo-fiducial mat 110 are not individually surveyed, but rather locations of geo-fiducials xx0-xx9 associated with geo-fiducial mat 110 are computable based upon location information of survey point 205 and the pre-specified unique directional and offset position of each of the geo-fiducials. Accordingly, the geo-fiducials are each calculated as directional offsets from the single surveyed point. The value of first segment 235 indicates whether the associated geo-fiducials are "adhoc" requiring computation. The illustrated embodiment reserves the value '9' for indicating adhoc, but of course, other values may be used. In particular, other values may be reserved to designate different types of geo-fiducial mats having different numbers of geo-fiducials in different configurations (e.g., directional and offset positions, fiducial sizes, etc.). For example, geo-fiducial mat 315 (see FIG. 3C) may be designated with a value of "11" while the geo-fiducial mat 300 (see FIG. 3A) may be designated with a value of "12", etc. The second segment 240 of the pad identification matches the common first portion 225 of the alphanumerical codes to provide association of the geo-fiducials to a given geo-fiducial mat 110, and in particular, association with the location information of survey point 205. In other embodiments, the order of the segments 235 and 240 or the order of the common and different portions 225 and 230 may be switched up.

In addition to integrated geo-fiducials, geo-fiducial mat 110 includes a number of other integrated features. For example, geo-fiducial mat 110 includes a marking indicating survey point 205. Survey point 205 provides the precise location for a field technician to survey. In the illustrated embodiment, survey point 205 is located in the center of landing pad region 201; however, survey point 205 may be located anywhere on geo-fiducial mat 110.

Another feature disposed on geo-fiducial mat 110 includes directional marker 215 for aligning geo-fiducial mat 110 with a predetermined direction. The directional marker 215 provides a simple visual guide to the field technician when deploying a new geo-fiducial mat 110. By aligning geo-fiducial mat 110 with the predetermined direction (e.g., magnetic north), the absolute positions of the geo-fiducials are determinable based upon the location information of the single survey point 205 and the unique directional and offset position specified for each of the geo-fiducials relative to survey point 205. The unique directional and offset positions are predetermined or known values.

Yet another feature of geo-fiducial mat 110 includes alignment markings 210. Alignment markings 210 are disposed on geo-fiducial mat 110 to indicate the landing pad region 211 and aid accurate alignment of landing pad 9xx to landing pad region 211. In the illustrated embodiment, alignment markings 210 define two different sizes for landing pad region 211 to facilitate accurate alignment of multiple different landing pads to geo-fiducial mat 110. Although FIG. 2A illustrates the use of right angle corner markings to define the rectangular shaped region of landing pad region 211, other markings may be used.

In one embodiment, geo-fiducial mat 110 is fabricated of a flexible substrate material that is amenable to rolling or folding. Alternatively, geo-fiducial mat 110 may be fabricated of more rigid or firm sections that can be disassembled into separable sections like a puzzle (e.g., see FIG. 3B). These rolling, folding, or separable implementations facilitate easy transport and deployment to remote or temporary locations. Geo-fiducial mat 110 may also include hold-down points 220 disposed about the perimeter to secure geo-fiducial mat 110 to the ground and ensure that wind or other environmental factors do not inadvertently move the mat. In the illustrated embodiment, hold-down points 220 are grommet holes that may be spiked or tied in location.

Figure 3A:
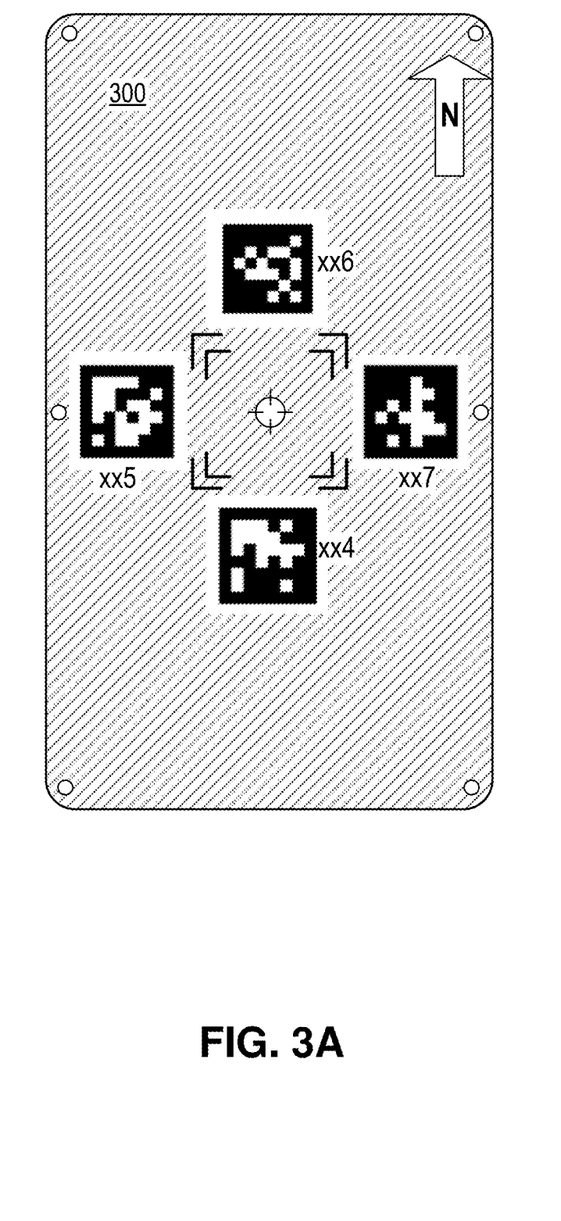
FIG. 3A illustrates a geo-fiducial mat including only mid-sized geo-fiducials, in accordance with an embodiment of the disclosure.
Figure 3B:
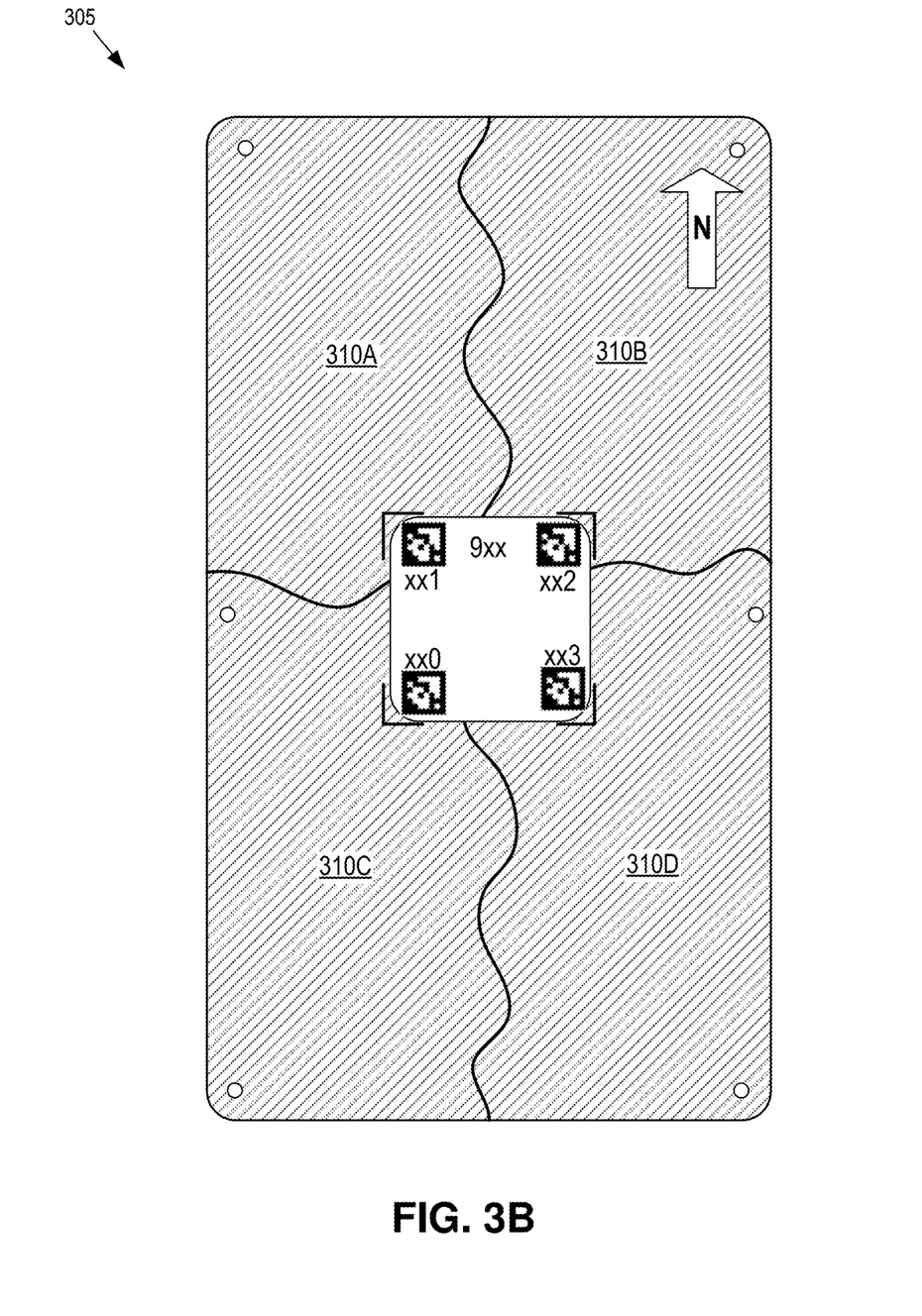
FIG. 3B illustrates a geo-fiducial mat used with only small-sized geo-fiducials, in accordance with an embodiment of the disclosure.
Figure 3C:
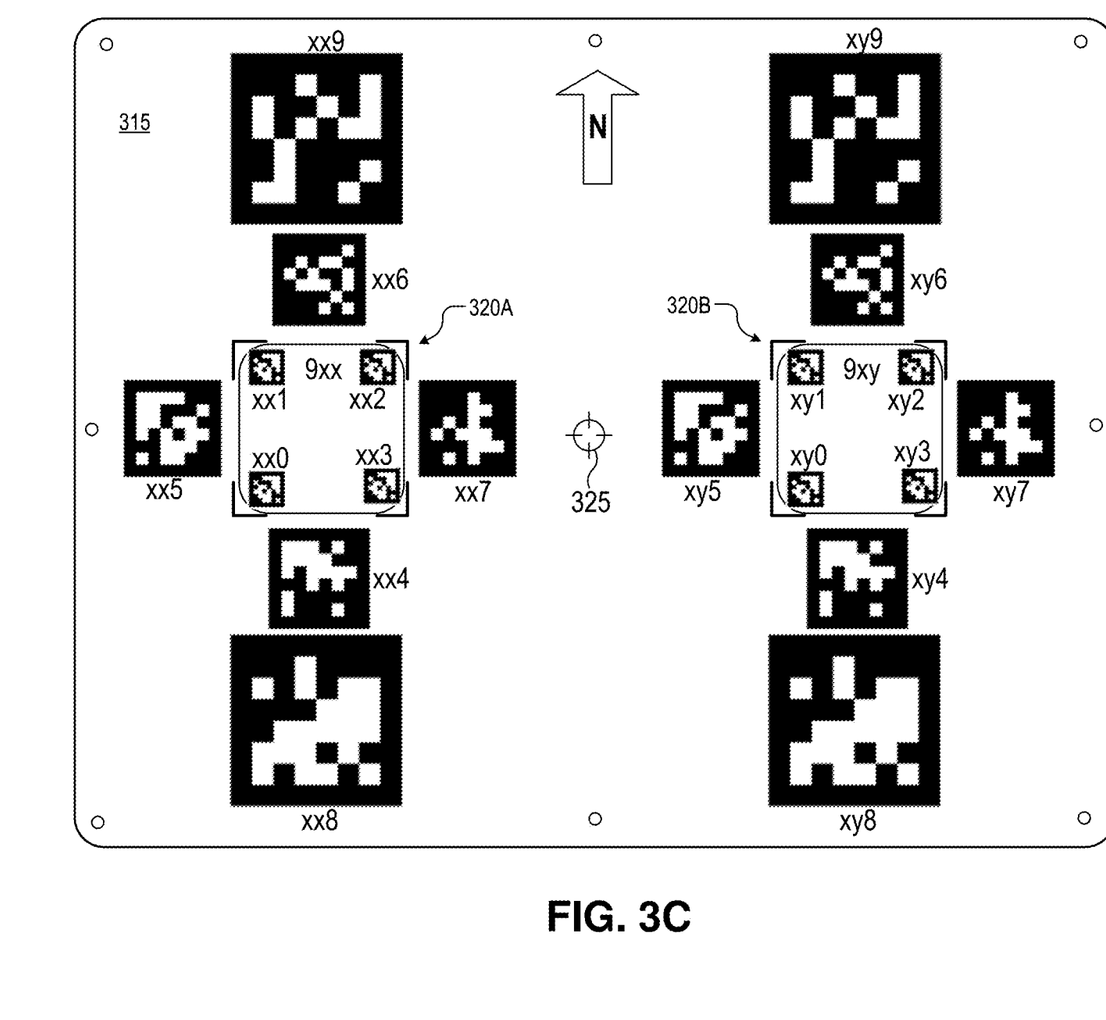
FIG. 3C illustrates a combo geo-fiducial mat including multiple landing pad regions having geo-fiducial referenced from a single survey point, in accordance with an embodiment of the disclosure.

FIG. 2A illustrates just one example configuration for deploying small, medium, and large geo-fiducials with geo-fiducial mat 110. FIGS. 3A-3C illustrate three other example configurations. These three configurations are not intended to be limiting, but rather merely demonstrative examples. FIG. 3A illustrates a geo-fiducial mat 300 including only mid-sized geo-fiducials xx4-xx7 integrated onto the mat while omitting the larger geo-fiducials. FIG. 3A illustrates four geo-fiducials, one disposed on each side of landing pad region 211. The use of multiple geo-fiducials on different sides of landing pad region 211 provides improved tolerance/robustness against environmental factors such as glare, shadows, etc. However, it should be appreciated that fewer than four mid-sized geo-fiducials may be used. For example, three mid-sized geo-fiducials may provide sufficient environmental robustness as well.

FIG. 3B illustrates a geo-fiducial mat 305 used with only small geo-fiducials xx0-xx3 disposed on landing pad 9xx. In the illustrated embodiment, geo-fiducial mat 305 does not include any integrated geo-fiducials; however, in another embodiment, one or more of small geo-fiducials xx0-xx3 may be integrated onto geo-fiducial mat 305 immediately adjacent to the landing pad region. FIG. 3B illustrates four small geo-fiducials, one disposed at each corner of landing pad 9xx. Similar, as mentioned above, it should be appreciated that fewer than four small geo-fiducials may be used. For example, three small geo-fiducials positioned in only three corners or along three sides may provide sufficient environmental robustness as well. FIG. 3B also illustrates how geo-fiducial mat 305 may be segmented into sections 310A-D, which are separable like a puzzle for easy transport and deployment. Although FIG. 3B illustrates just four sections 310, more or less separable sections may be implemented. The separation interface between each section need not undulate as demonstratively illustrated.

FIG. 3C illustrates a combo geo-fiducial mat 315 including multiple landing pad regions 320A and 320B having geo-fiducial referenced from a single survey point 325, in accordance with an embodiment of the disclosure. As illustrated, a single geo-fiducial mat 315 with a single survey point 325 can be deployed to service multiple landing pads 9xx and 9xy. Geo-fiducial mat 315 facilitates quick deployments of fleets of UAVs. Although FIG. 3C illustrates, just two landing pads sharing a single geo-fiducial mat, in other embodiments, geo-fiducial mats that can accommodate more than two landing pads are envisioned.

Figure 4A:
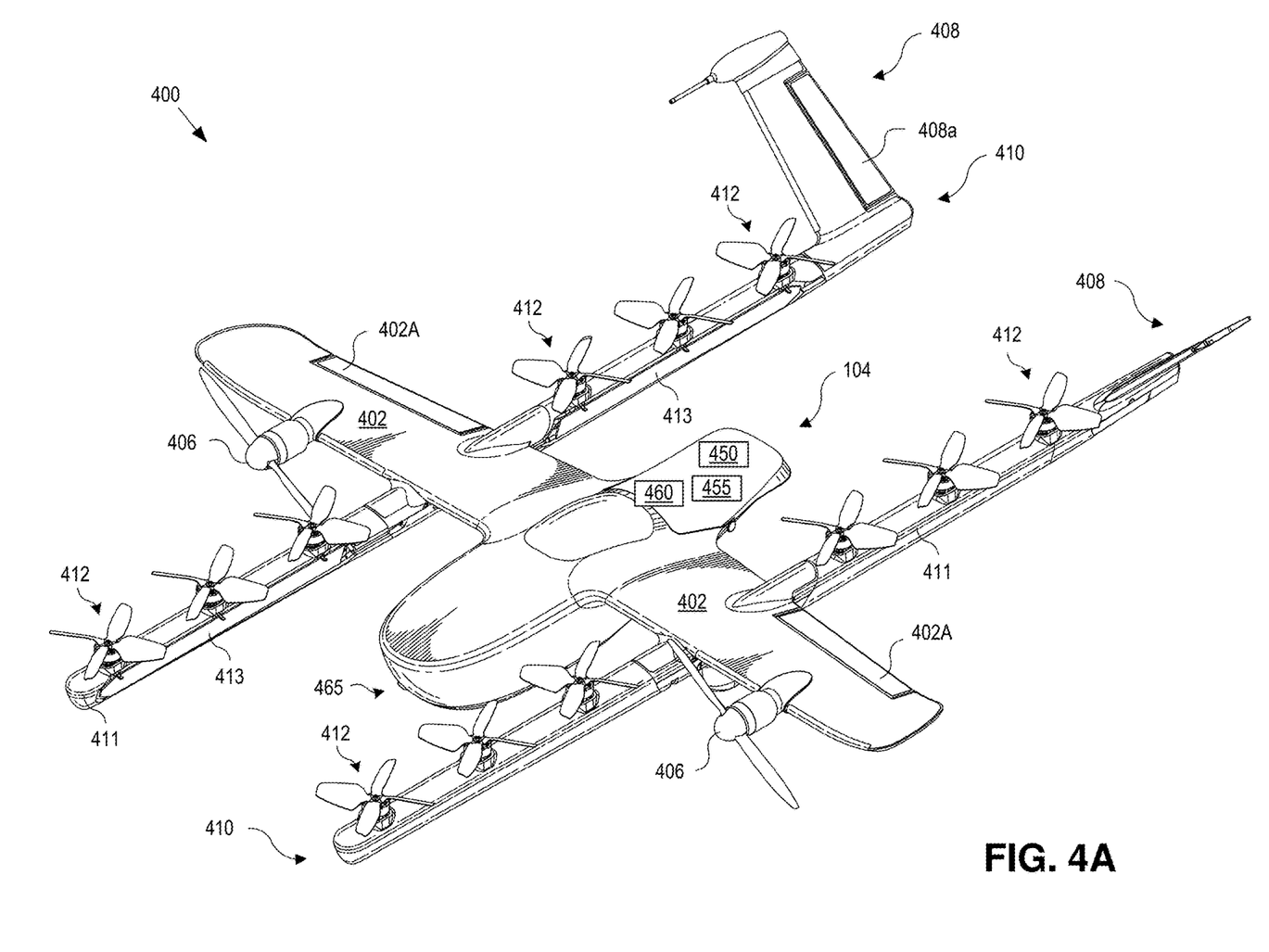
FIGS. 4A and 4B illustrate perspective and underside views of a demonstrative UAV capable of navigating via a GPS signal or optical triangulation using geo-fiducials, in accordance with an embodiment of the disclosure.
Figure 4B:
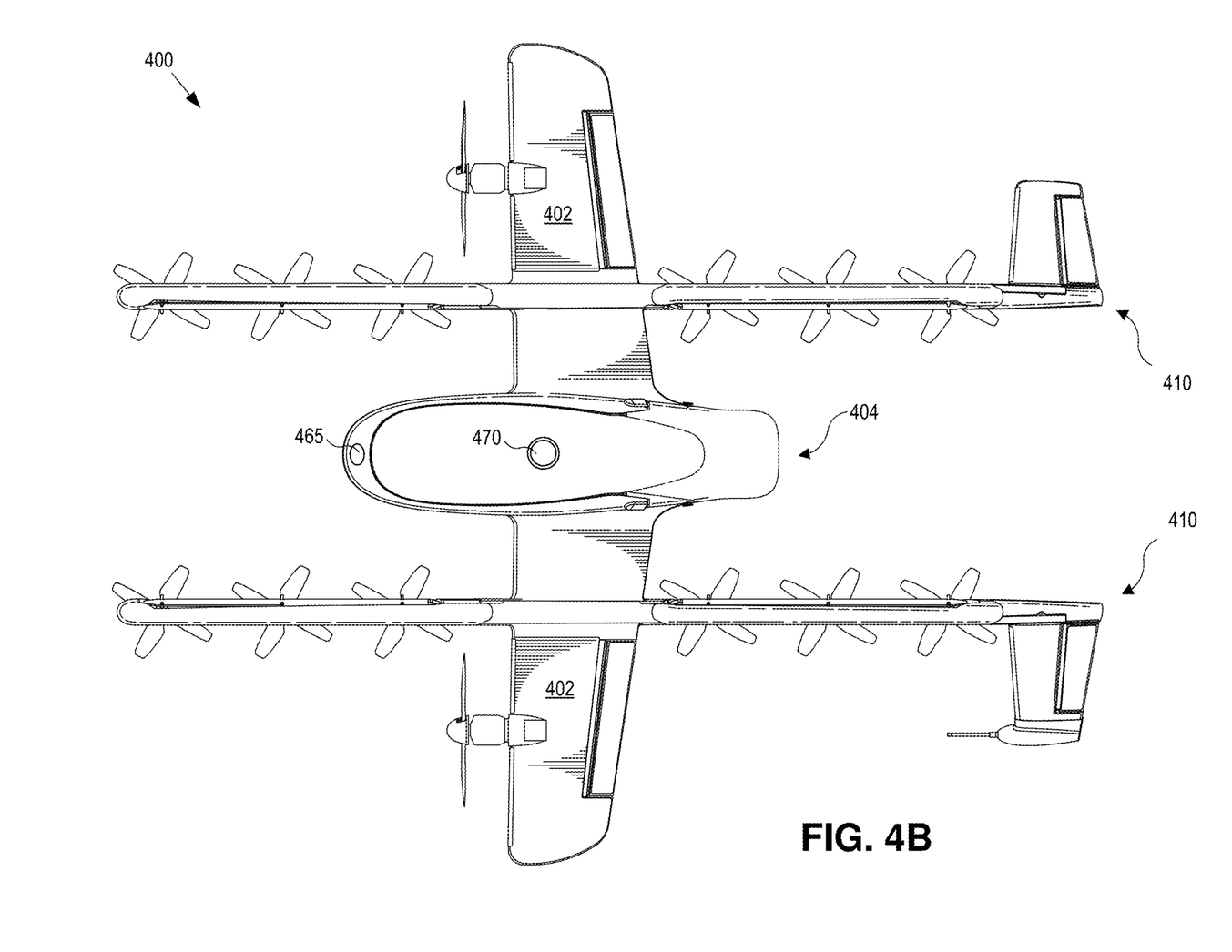

FIGS. 4A and 4B illustrate perspective and underside views of a demonstrative UAV 400 capable of navigating via optical triangulation using geo-fiducials, in accordance with an embodiment of the disclosure. UAV 400 is one possible implementation of UAV 105. The illustrated embodiment of UAV 400 is a vertical takeoff and landing (VTOL) UAV that includes separate propulsion units 406 and 412 for providing horizontal and vertical propulsion, respectively. UAV 400 is a fixed-wing aerial vehicle, which as the name implies, has a wing assembly 402 that can generate lift based on the wing shape and the vehicle's forward airspeed when propelled horizontally by propulsion units 406. FIG. 4A is a perspective top view illustration of UAV 400 while FIG. 4B is a bottom side plan view illustration of the same.

The illustrated embodiment of UAV 400 includes a fuselage 404. In one embodiment, fuselage 404 is modular and includes a battery module, an avionics module, and a mission payload module. The battery module includes a cavity for housing one or more batteries for powering aerial vehicle 400. The avionics module houses flight control circuitry of aerial vehicle 400, which may include a controller 450 (e.g., processor and memory), communication electronics and antennas (e.g., cellular transceiver, wifi transceiver, etc.), an optical navigation system 455, and various sensors (e.g., global positioning sensor 460, an inertial measurement unit (IMU), a magnetic compass, etc.). The optical navigation system 455 may include one or more cameras, such as a forward-facing camera 465 and downward facing camera 470 for identifying, reading, and triangulating geo-fiducials. The mission payload module houses equipment associated with a mission of aerial vehicle 400. For example, the mission payload module may include a payload actuator for holding and releasing an externally attached payload. In another embodiment, the mission payload module may include a camera/sensor equipment holder for carrying camera/sensor equipment (e.g., camera, lenses, radar, lidar, pollution monitoring sensors, weather monitoring sensors, etc.).

The illustrated embodiment of UAV 400 further includes horizontal propulsion units 406 positioned on wing assembly 402, which can each include a motor, shaft, motor mount, and propeller, for propelling UAV 400. The illustrated embodiment of UAV 400 includes two boom assemblies 410 that secure to wing assembly 402. In one embodiment, wing assembly 402 includes a wing spar (not illustrated) disposed within a wing foil of wing assembly 402. The wing spar may be a hollow structural member (e.g., tubular rod) extending along the internal length of the wing foil and provides a main structural member that connects wing assembly 402 to fuselage 404 and to which boom assemblies 410 mount.

The illustrated embodiments of boom assemblies 410 each include a boom housing 411 in which a boom spar (not illustrated) is disposed, vertical propulsion units 412, printed circuit boards 413, and stabilizers 408. Boom spars may also be hollow structural members (e.g., tubular rods) that provide the main structural support to which the wing spar and vertical propulsion units 412 are mounted. The boom spars are also referred to as "boom carriers" since they carry the load forces on boom assemblies 410. Vertical propulsion units 412 can each include a motor, shaft, motor mounts, and propeller, for providing vertical propulsion. Vertical propulsion units 412 may be used during a hover mode where UAV 400 is descending (e.g., to a landing pad) or ascending (e.g., takeoff from a landing pad). Stabilizers 408 (or fins) may be included with UAV 400 to stabilize the UAV's yaw (left or right turns) during flight.

During flight, UAV 400 may control the direction and/or speed of its movement by controlling its pitch, roll, yaw, and/or altitude. For example, the stabilizers 408 may include one or more rudders 408a for controlling the UAV's yaw, and wing assembly 402 may include elevators for controlling the UAV's pitch and/or ailerons 402a for controlling the UAV's roll. As another example, increasing or decreasing the speed of all the propellers simultaneously can result in UAV 400 increasing or decreasing its altitude, respectively.

Many variations on the illustrated fixed-wing aerial vehicle are possible. Although FIGS. 4A and 4B illustrate one wing assembly 402, two boom assemblies 410, two horizontal propulsion units 406, and six vertical propulsion units 412 per boom assembly 410, it should be appreciated that other variants of UAV 400 may be implemented with more or less of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

Figure 5:
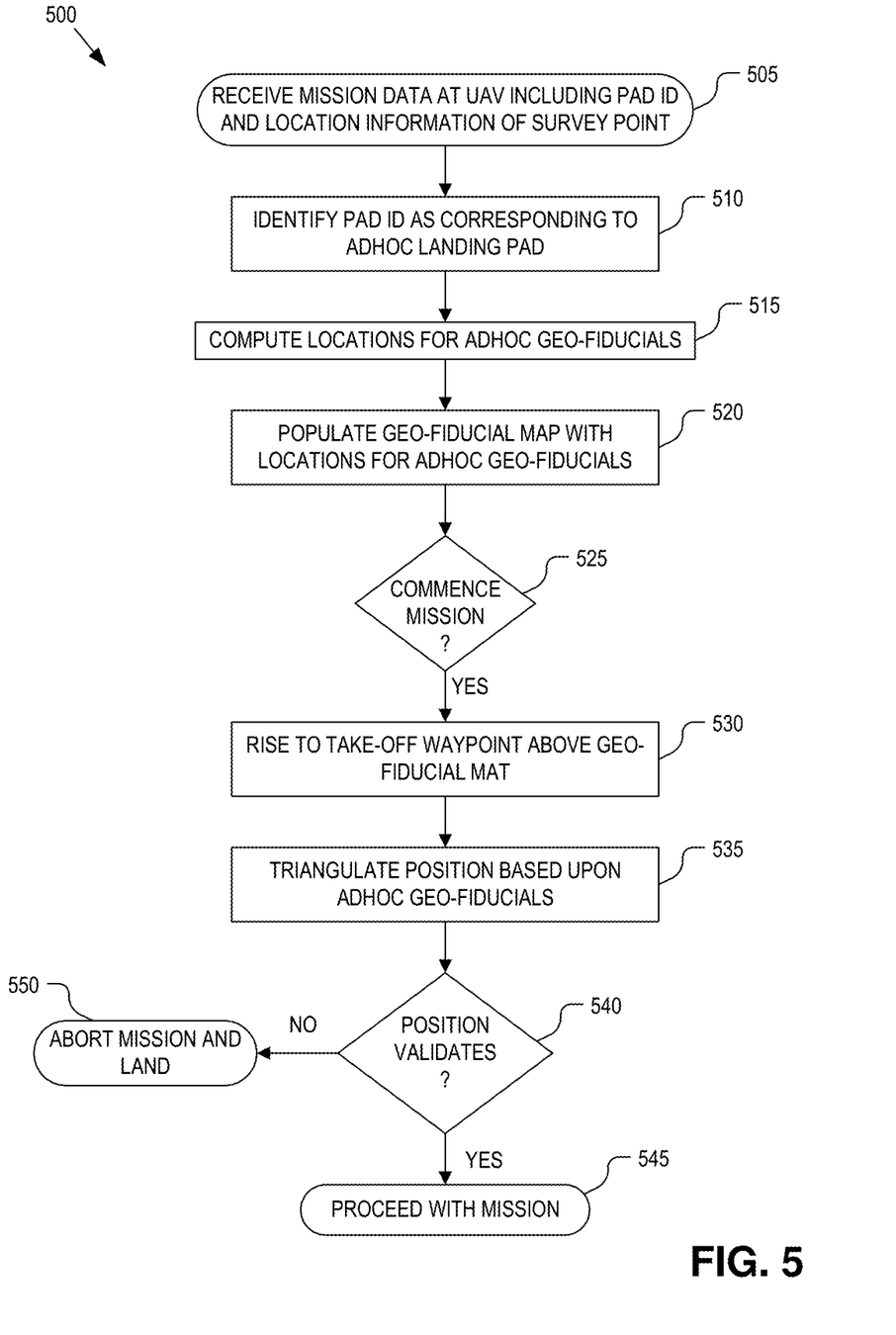
FIG. 5 is a flow chart illustrating a process for using adhoc geo-fiducials on a geo-fiducial mat to navigate a takeoff, in accordance with an embodiment of the disclosure.

FIG. 5 is a flow chart illustrating a process 500 for using adhoc geo-fiducials (e.g., geo-fiducials xx0-xx9) on geo-fiducial mat 110 to navigate a takeoff, in accordance with an embodiment of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

A process block 505, UAV 105 receives mission data for a new mission from an operations server (aka nest manager). The mission data includes the pad identification (e.g., 9xx) of the mission home or landing pad from where UAV 105 will commence its mission. The landing pad may also serve as a charging pad that charges the on-board battery of UAV 105. The mission data also includes location information of survey point 205.

Upon initialization, the controller of UAV 105 reviews the mission data, including the first segment 235 of the pad identification. If the first segment 235 has a value (e.g., 9) indicating that the landing pad is associated with a geo-fiducial mat 110, then the controller will recognize that the landing pad is associated with a geo-fiducial mat 110 having multiple adhoc geo-fiducials (e.g., xx0-xx9) (process block 505).

In a process block 515, the locations of each adhoc geo-fiducial is computed based upon the location information received for survey point 205 and the unique directional and offset positions specified for each of the geo-fiducials. The specified directional and offset positions may be pre-programmed values within the controller.

Figure 6:
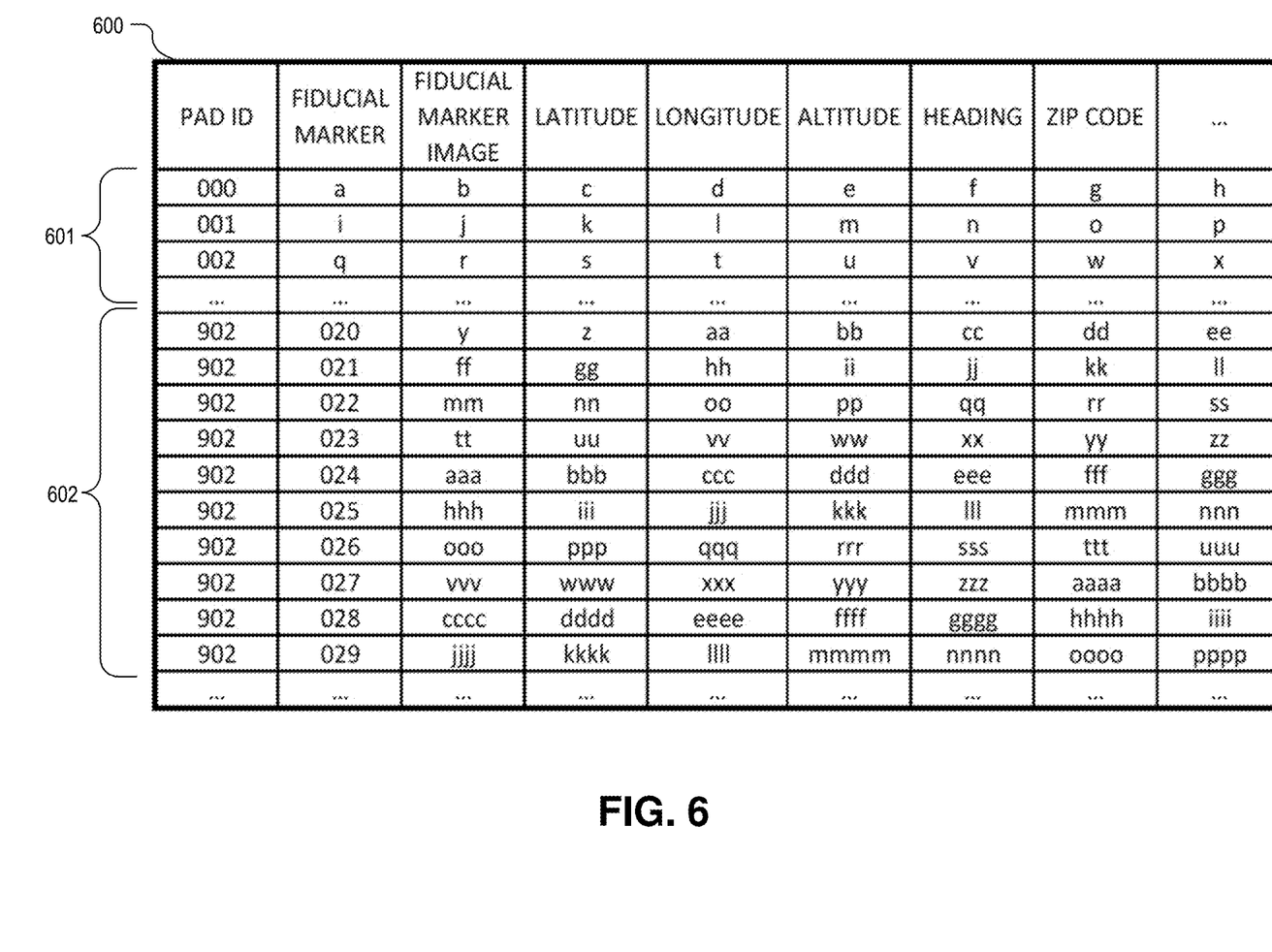
FIG. 6 is a chart illustrating an example geo-fiducial map including entries populated for both regular and adhoc geo-fiducials, in accordance with an embodiment of the disclosure.

In a process block 520, the computed locations for each adhoc geo-fiducial xx0-xx9 are populated into a geo-fiducial map stored within UAV 105. The geo-fiducial map is referenced by the controller of UAV 105 for identifying geo-fiducials, determining their location, and then self-triangulating therefrom. FIG. 6 illustrates an example geo-fiducial map 600 that includes entries 601 for standard preprogrammed geo-fiducials and entries 602 for adhoc geo-fiducials that may be added into the geo-fiducial map 600 on-the-fly. Geo-fiducial map 600 is merely demonstrative, but the illustrated example includes columns for a pad ID, a fiducial marker (or code), an associated fiducial marker image, a latitude, a longitude, an altitude, a heading, and a zip code. Not all illustrated columns may be necessary in all embodiments, and furthermore, other columns may be added.

After the latitude and longitude locations for the adhoc geo-fiducials are calculated and populated into geo-fiducial map 600, then the mission can commence in a decision block 525. In a process block 530, UAV 105 rises to a takeoff waypoint above geo-fiducial mat 110. The takeoff waypoint may be approximately 1 m above geo-fiducial mat 110. The takeoff waypoint may be considered as a validation waypoint. At the takeoff waypoint, the optical navigation system of UAV 105 triangulates its current position based upon one or more adhoc geo-fiducials xx0-xx9 (process block 535). The optically triangulated position is compared against a GPS sensed position, and if it validates within an acceptable margin of error (decision block 540), then UAV 105 proceeds with its mission (process block 545). If the optically triangulated position does not agree with the GPS position within an acceptable margin of error (decision block 540), then the mission is aborted and UAV 105 lands back on the landing pad (process block 550). In other words, the geo-fiducials can be used by UAV 105 to validate the correct operation of its GPS sensor.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus for visual navigation of an unmanned aerial vehicle (UAV), the apparatus comprising:
   a geo-fiducial mat including:
      a landing pad region that provides a location for aligning with a landing pad of the UAV; and
      alignment markings disposed on the geo-fiducial mat for indicating the landing pad region and aiding alignment of the landing pad to the landing pad region; and
   a plurality of geo-fiducials disposed in or about the landing pad region and each specified for a unique directional and offset position on the geo-fiducial mat, wherein the geo-fiducials each includes a two-dimensional (2D) pattern that visually conveys a code, wherein the 2D pattern of each of the geo-fiducials has a shape from which an optical navigation system of the UAV can visually triangulate a position of the UAV.

2. The apparatus of claim 1, wherein the unique directional and offset position of each of the geo-fiducials is specified relative to a survey point for the geo-fiducial mat.

3. The apparatus of claim 1, wherein the geo-fiducials comprise at least three geo-fiducials that each convey a different code and are disposed at three different corners or along three different sides of the landing pad region.

4. The apparatus of claim 1, wherein the geo-fiducials comprise:
   first geo-fiducials having a first size that are configured to be disposed on or attached to the landing pad.

5. The apparatus of claim 4, wherein the geo-fiducials further comprise:
   second geo-fiducials having a second size, larger than the first size, the second geo-fiducials positioned further from a center of the landing pad region than the first geo-fiducials.

6. The apparatus of claim 5, wherein the geo-fiducials further comprise:
   third geo-fiducials having a third size, larger than the first and second sizes, the third geo-fiducials positioned further from the center of the landing pad region than the first and second geo-fiducials.

7. The apparatus of claim 5, wherein the landing pad region comprises a rectangular shaped region, wherein the first geo-fiducials are disposed proximate to corners of the landing pad region, and wherein the second geo-fiducials are substantially centered along sides of the landing pad region.

8. The apparatus of claim 5, wherein the second geo-fiducials are integrated into the geo-fiducial mat while the first geo-fiducials are configured to be physically distinct and separate from the geo-fiducial mat for adhering to or otherwise disposing on the landing pad of the UAV.

9. The apparatus of claim 2, wherein the geo-fiducial mat further includes:
   a directional marker disposed on the geo-fiducial mat for aligning the geo-fiducial mat with a predetermined direction such that positions of the geo-fiducials are determinable based upon location information of the survey point and the unique directional and offset position specified for each of the geo-fiducials.

10. The apparatus of claim 1, wherein the code conveyed by each of the geo-fiducials shares a common first portion that is associated with a pad identification of the landing pad and a different second portion that individually distinguishes each of the geo-fiducials of the geo-fiducial mat from each other.

11. The apparatus of claim 10, wherein the pad identification includes:
   a first segment having a value indicating that the geo-fiducials are not individually surveyed, but rather locations of the geo-fiducials are computable based at least in part upon location information of the survey point; and
   a second segment that matches the common first portion of the code of each of the geo-fiducials.

12. The apparatus of claim 1, wherein the geo-fiducial mat comprises a flexible substrate material that is amenable to rolling or folding.

13. The apparatus of claim 1, wherein the 2D pattern is different for each of the geo-fiducials and visually conveys a different code for each of the geo-fiducials.

14. A system for navigating an unmanned aerial vehicle (UAV) during landing or takeoff, the system comprising:
   a charging pad for charging the UAV;
   a geo-fiducial mat including a landing pad region that provides a location for aligning the charging pad with the geo-fiducial mat, wherein the geo-fiducial mat includes a flexible substrate material that is amenable to rolling or folding; and
   a plurality of geo-fiducials disposed in or about the charging pad region, wherein the geo-fiducials each includes a two-dimensional (2D) pattern that visually conveys an alphanumerical code different from each other, wherein the 2D pattern of each of the geo-fiducials has a shape from which an optical navigation system of the UAV can visually triangulate a position of the UAV.

15. The system of claim 14, wherein the geo-fiducials comprise:

first geo-fiducials having a first size that are configured to be disposed on or attached to the charging pad.

16. The system of claim 14, wherein the geo-fiducials comprise:
 first geo-fiducials having a first size;
 second geo-fiducials having a second size, larger than the first size, the second geo-fiducials positioned further from a center of the landing pad region than the first geo-fiducials; and
 third geo-fiducials having a third size, larger than the first and second sizes, the third geo-fiducials positioned further from the center of the landing pad region than the first and second geo-fiducials.

17. The system of claim 16, wherein the landing pad region comprises a rectangular shaped region, wherein the first geo-fiducials are disposed proximate to corners of the landing pad region, and wherein the second and third geo-fiducials are substantially centered along sides of the landing pad region.

18. The system of claim 16, wherein the second and third geo-fiducials are integrated into the geo-fiducial mat while the first geo-fiducials are configured to be physically distinct and separate from the geo-fiducial mat for adhering to or otherwise disposing on the charging pad of the UAV.

19. The system of claim 14, wherein the geo-fiducial mat further includes:
 a directional marker disposed on the geo-fiducial mat for aligning the geo-fiducial mat with a predetermined direction such that positions of the geo-fiducials are determinable based upon location information of a survey point and a unique directional and offset position specified for each of the geo-fiducials relative to the survey point; and
 alignment markings disposed on the geo-fiducial mat for indicating the landing pad region and aiding alignment of the charging pad to the landing pad region.

20. The system of claim 14, wherein the alphanumerical code conveyed by each of the geo-fiducials shares a common first portion that is associated with a pad identification of the landing pad and a different second portion that individually distinguishes each of the geo-fiducials of the geo-fiducial mat from each other.

21. The system of claim 14, further comprising the UAV, wherein the UAV includes a controller coupled to memory storing instructions that when executed by the controller cause the UAV to perform operations comprising:
 flying the UAV to a takeoff way point above the geo-fiducial mat;
 visually triangulating the position of the UAV with the optical navigation system based upon one or more of the geo-fiducials; and
 validating correct operation of a global positioning system (GPS) sensor at the takeoff waypoint based upon the position that is visually triangulated.

* * * * *

UNITED STATES PATENT AND TRADEMARK OFFICE
CERTIFICATE OF CORRECTION

PATENT NO. : 11,745,899 B2
APPLICATION NO. : 17/974164
DATED : September 5, 2023
INVENTOR(S) : D. Jourdan et al.

Page 1 of 1

It is certified that error appears in the above-identified patent and that said Letters Patent is hereby corrected as shown below:

In the Claims

| Column | Line | |
|---|---|---|
| 10 | 59 | change "**charging**" to -- **landing** -- |

Signed and Sealed this
Twenty-first Day of November, 2023

Katherine Kelly Vidal
*Director of the United States Patent and Trademark Office*